United States Patent
Kawasaki et al.

(10) Patent No.: US 6,513,490 B2
(45) Date of Patent: Feb. 4, 2003

(54) UNTHROTTLED INTAKE AIR CONTROL WITH PARTIAL DELAY FOR REQUESTED ENGINE RESPONSE PERFORMANCE

(75) Inventors: Takao Kawasaki, Kanagawa (JP); Masahiro Arai, Yokohama (JP); Hatsuo Nagaishi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 233 days.

(21) Appl. No.: 09/727,787

(22) Filed: Dec. 4, 2000

(65) Prior Publication Data

US 2001/0002589 A1 Jun. 7, 2001

(30) Foreign Application Priority Data

| Dec. 2, 1999 | (JP) | 11-343910 |
| Dec. 3, 1999 | (JP) | 11-345374 |
| Dec. 3, 1999 | (JP) | 11-345375 |
| Dec. 15, 1999 | (JP) | 11-356401 |

(51) Int. Cl.$^7$ .............................................. F02D 41/00
(52) U.S. Cl. ............................. 123/339.16; 123/90.15
(58) Field of Search ...................... 123/90.15, 339.16; 701/115; 73/118.2

(56) References Cited

U.S. PATENT DOCUMENTS

| 5,184,577 A | | 2/1993 | Kato et al. | |
| 5,785,016 A | | 7/1998 | Enderle et al. | 123/90.11 |
| 5,937,808 A | * | 8/1999 | Kako et al. | 123/90.15 |
| 6,047,681 A | | 4/2000 | Scherer et al. | |
| 6,260,524 B1 | * | 7/2001 | Wachi | 123/90.15 |
| 6,276,316 B1 | * | 8/2001 | Arai et al. | 123/316 |
| 6,386,157 B1 | * | 5/2002 | Hartke et al. | 123/90.11 |
| 6,390,063 B1 | * | 5/2002 | Obata et al. | 123/399 |
| 6,412,455 B1 | * | 7/2002 | Ogiso et al. | 123/399 |

FOREIGN PATENT DOCUMENTS

| EP | 0 821 150 A2 | 1/1998 |
| EP | 0 953 750 | 11/1999 |
| JP | 8-200025 | 8/1996 |
| JP | 10-37727 | 2/1998 |

* cited by examiner

Primary Examiner—John Kwon
(74) Attorney, Agent, or Firm—Foley & Lardner

(57) ABSTRACT

A system and method for unthrottled intake air control for an internal combustion engine. The engine has at least one combustion chamber provided with electromagnetic intake means. The opening and closing times of the intake means are adjustable entirely independently from the crankshaft position to control intake air supplied to the combustion chamber. A control unit is used to implement instructions for determining a first portion of requested intake airflow, which first portion requests a first engine response performance, and instructions for determining a second portion of requested intake airflow, which second portion requests a second engine response performance. The control unit implements instructions for processing the first and second airflow portions to make contributions to the first and second engine response performances, respectively, instructions for determining an intake means activation command, and instructions for providing the intake means activation command to the intake means to provide an engine response performance combining the first engine response performance with the second engine response performance.

19 Claims, 17 Drawing Sheets

UNTHROTTLED INTAKE AIR CONTROL WITH PARTIAL DELAY FOR REQUESTED ENGINE RESPONSE PERFORMANCE

BACKGROUND OF THE INVENTION

1. Field of the Invention

The present invention relates to a system and method for unthrottled intake air control for an internal combustion engine.

2. Terminology

Engine Displacement

This is used herein to mean the sum of displacements of all of cylinders of an engine. "Engine displacement" and "displacement of an engine" are synonyms. In the description, the reference character "VOL#" is used to represent the "engine displacement".

Volumetric Airflow Ratio

This is used herein to mean a ratio between the volumetric airflow admitted to cylinders of an engine through a given effective flow cross sectional area and the maximum volumetric airflow admitted to all of the cylinders of the engine through the maximum effective flow cross sectional area. The maximum effective flow cross sectional area is provided when all the cylinder of the engine are in operation with a throttle in an intake manifold kept at WOT position. In the description, the reference characters "QH0STL", "TQH0ST1", "TQH0ST2", "TQH0ST", "QH0STL*" and "TQH0ST*" are used to represent the "volumetric airflow ratio" and this ratio is expressed in terms of percentage (%).

Opening Area for Unit Volumetric Airflow

This is used herein to mean a value resulting from dividing (opening area for requested airflow) by (engine displacement VOL#) and then by (engine speed NE). In the description, the reference characters "GADNVL", "TGADNV1", "TGADNV2", "TGADNV", "GADNVL*" and "TGADNV*" are used to represent "opening area for unit volumetric airflow."

DESCRIPTION OF THE RELATED ART

Most commercially available automotive engines use a throttle valve to control engine load by throttling intake air. As a result, there is a compromise between the best fuel economy, emission control and engine power conditions.

Potentially, better fuel economy, emission control and engine output benefits can be realized and particularly at part load conditions if the engine pumping losses are eliminated or minimized. This can be realized by using unthrottled operation coupled with a phase shifting of the intake valve event from a normal schedule to close within a range of either early or late in the engine cycle as a function of air charge to be trapped.

JP-A 10-37727 discloses a system for eliminating cylinder to cylinder torque variation by controlling intake valve close times in such a manner that air charges trapped may become equal to each other.

Control strategies for unthrottled intake air control have not evolved to a satisfactory level. Control strategies may imitate control strategies for throttled intake air control. However, the ability of the controller to adjust the intake valve open and/or close times or timings independently from the crankshaft position and the accelerator pedal position offers a great flexibility in setting engine response performance within a range between aggressive response and sluggish response.

To provide optimal driving comfort, it is desirable to provide unthrottled intake air control coupled with appropriate engine response performance.

SUMMARY OF THE INVENTION

It is an object of the present invention to provide a system and method for unthrottled intake air control which can provide different engine response performances to meet different requests.

According to one aspect of the present invention, there is provided a method for unthrottled control of intake air for an internal combustion engine, the engine having at least one combustion chamber provided with intake means, wherein the opening and closing times of the intake means are adjustable entirely independently from the crankshaft position to control intake air supplied to the combustion chamber, the method comprising:

determining a first portion of requested intake airflow, which first portion requests a first engine response performance;

determining a second portion of said requested intake airflow, which second portion requests a second engine response performance;

processing said first and second portions of said requested intake airflow to make contributions to said first and second engine response performances, respectively, and to provide processed requested airflow;

determining an intake means activation command in response to said processed requested airflow; and providing said intake means activation command to the intake means to provide an engine response performance combining said first engine response performance with said second engine response performance.

BEST MODES FOR CARRYING OUT THE INVENTION

Figure 1:
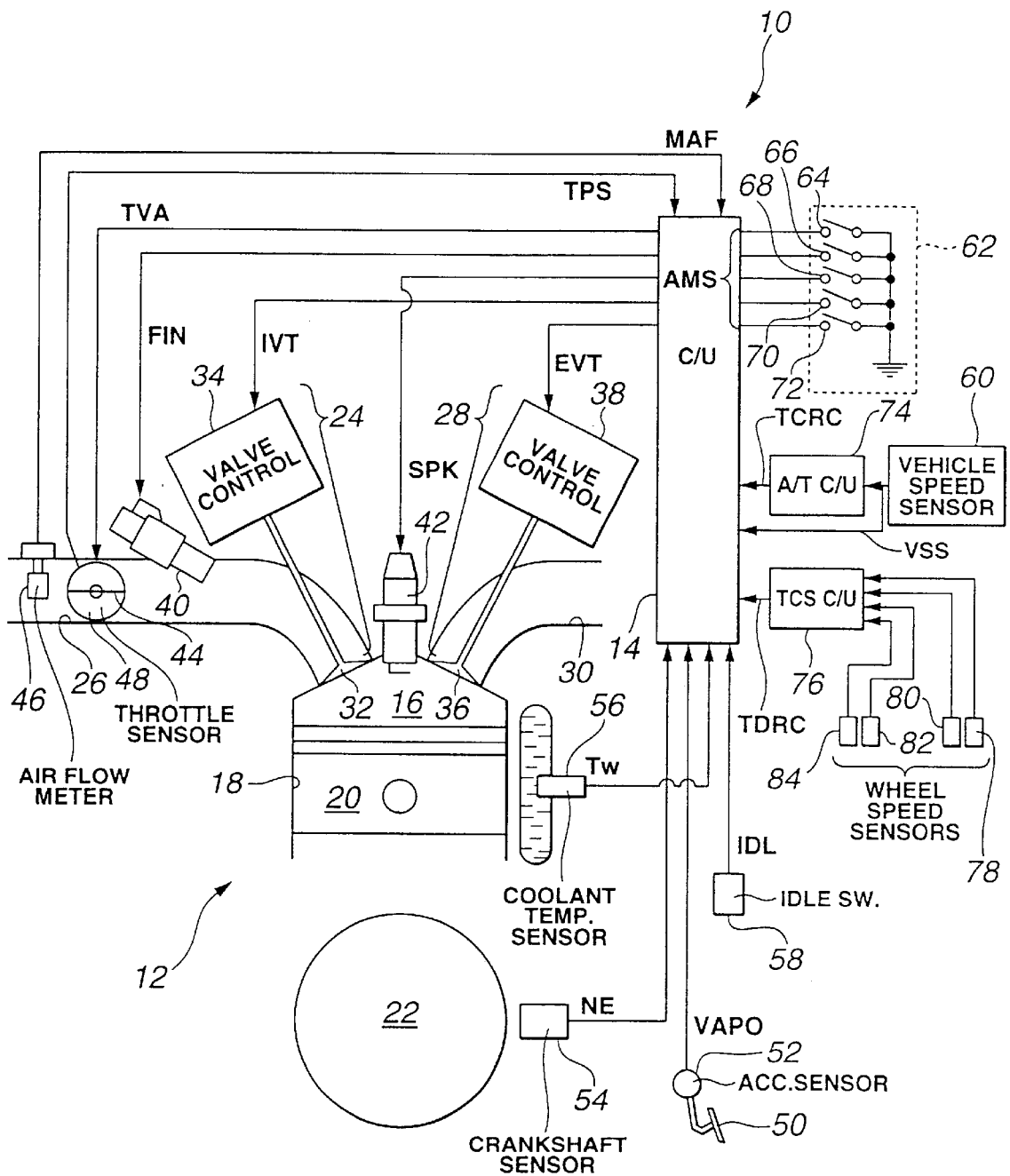
FIG. 1 is a block diagram illustrating a system and method for unthrottled intake air control for an internal combustion engine according to the present invention.

FIG. 1 is a block diagram illustrating operation of a system or method for providing unthrottled intake air control with partially delayed engine response according to the present invention. System 10 includes an internal combustion engine, indicated generally by reference numeral 12, in communication with a control unit (C/U) 14 As schematically shown in FIG. 1, engine 12 has at least one combustion chamber 16 defined within a cylinder 18 by a reciprocating piston 20 operatively connected to a crankshaft 22. Combustion chamber 16 is provided with intake means 24 together with an intake manifold 26 and exhaust means 28 together with an exhaust manifold 30. Intake means 24 include at least one intake valve 32, each driven by a variable valve control 34. Exhaust means 28 include at least one exhaust valve 36, each driven by a variable valve control 38. Fuel is injected into combustion chamber 16 through an injection nozzle 40. A spark plug 42 produces a spark to initiate combustion of combustible charge within combustion chamber 16. A throttle valve 44 is located within intake manifold 26.

Various sensors are provided to monitor engine operating conditions. Sensors may include an air flow meter 46, which provides a mass air flow (MAF) signal to C/U 14 to monitor the air intake into intake manifold 26. A throttle sensor 48 provides a throttle position sensor (TPS) signal to C/U to monitor the throttle opening angle or position of throttle valve 44. An accelerator pedal 50 is used to determine the operator or driver torque request command. An accelerator sensor 52 provides a vehicle accelerator pedal opening (VAPO) or pedal position signal indicative of the accelerator pedal opening angle or position of accelerator pedal 50.

Engine 12 includes various other sensors such as a crankshaft sensor or engine speed sensor 54, which provides a signal indicative of engine speed (NE) to C/U 14, and an engine coolant temperature sensor 56 and an idle switch 58. Engine coolant temperature sensor 56 provides an engine coolant temperature (Tw) signal indicative of the engine coolant temperature to C/U 14. Engine 12 may include an idle switch 58, which provides an idle (IDL) signal to C/U 14 when accelerator pedal 50 assumes a released or rest position. A vehicle speed sensor 60 provides a vehicle speed sensor (VSS) signal indicative of vehicle speed to C/U 14.

Enclosed by a dotted line drawn rectangle are various switches for auxiliary machines driven by engine 12. The various switches may include a power steering switch 64, an air conditioner switch 66, an electric load switch 68, a radiator fan switch 70, and a blower fan switch 72. Each of auxiliary machine switches 64, 66, 68, 70 and 72 provides an auxiliary machine switch (AMS) signal to C/U 14 when the associated auxiliary machine is put into operation to apply additional load to engine 12.

C/U 14 communicates with an automatic transmission (A/T) control unit (C/U) 74 and also with a traction control system (TCS) control unit (C/U) 76. As is well known in the art, A/T C/U 74 receives VSS signal from sensor 60 and other signals to control a speed ratio change in the A/T. A/T C/U 74 provides a torque change request command (TCRC) signal to C/U 14 to reduce shocks occurring due to speed ratio change. In a well known manner in the art, TCS C/U receives signals from wheel speed sensors 78, 80, 82 and 84 for front left, front right, rear left and rear right wheels, respectively, to maintain traction by providing a torque down request command (TDRC) to C/U 14 upon determination of occurrence of slip.

Figure 2:
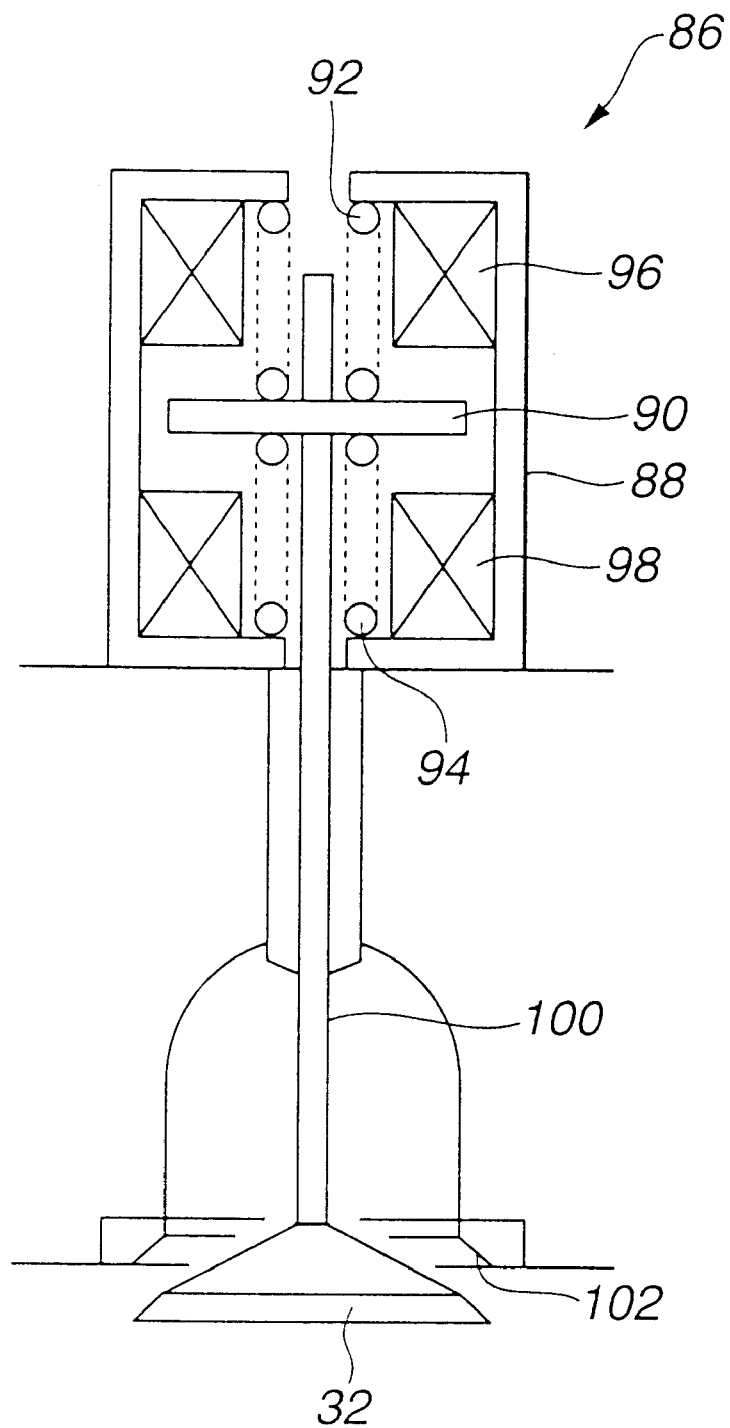
FIG. 2 is a schematic view of an electromagnetic driver (EMD) used in each of valve controllers for intake and exhaust valves for a combustion chamber.

FIG. 2 provides a schematic view of an EMD 86, which is used in each of valve controls 34 and 38, for the associated cylinder valve, for example, intake valve 32. EMD 86 includes a housing 88, a movable plate 90 is kept in a neutral position, as illustrated in FIG. 2, within housing 88 by means of two springs 92 and 94. Springs 92 and 94 are arranged on one and the. opposite sides of movable plate 90. At the remotest ends, springs 92 and 94 bear against housing 88. At the nearest ends, springs 92 and 94 bear against spaced walls of movable plate 90. Two electromagnetic coils 96 and 98 are mounted to housing 88 on one and the opposite sides of movable plate 90. With no supply of electric current through electromagnetic coil 98, supply of electric current through electromagnetic coil 96 attracts movable plate 90 for movement against the action of spring 92. Supply of electric current through electromagnetic coil 98 with no supply of electric current through electromagnetic coil 96 attracts movable plate 90 for movement against the action of spring 94. In order to transmit at least movement of movable plate 90 in a direction against spring 94 to intake valve 32, the valve stem is operatively connected to movable plate 90. Thus, with no supply of electric current through electromagnetic coil 96, supply of electromagnetic coil 98 can hold intake valve 32 lifted from a rest position where intake valve 32 rests on a valve seat 102. In this embodiment, valve stem 100 is fixed to movable plate 90 so that supply of electric current through electromagnetic coil 96 with interruption of supply of electric current through electromagnetic coil 98 can hold intake valve 32 to the rest position.

Figure 3:
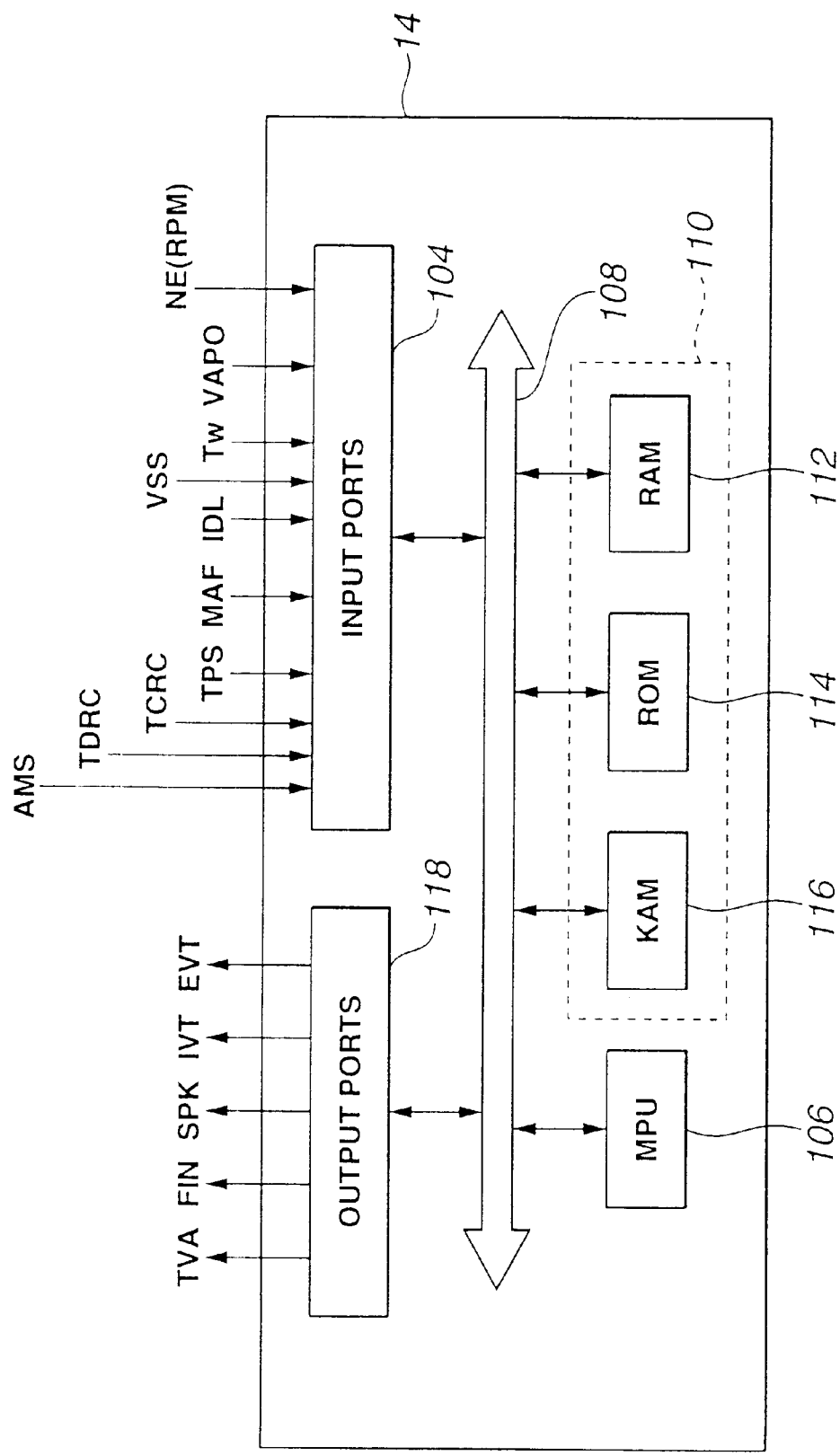
FIG. 3 is a block diagram of a control unit implementing the present invention.

Referring to FIG. 3, C/U 14 receives signals from the various sensors, switches and control units via input ports 104, which may provide signal conditioning, conversion, and/or fault detection as well known in the art. Input ports 104 communicate with processor (MPU) 106 via a data/control bus 108. MPU 106 implements control logic in the form of hardware and/or software instructions, which may be stored in a computer-readable media 110 to effect intake air control for engine 12. Computer-readable media 110 may include various types of volatile and nonvolatile memory such as random-access memory (RAM) 112, read-only memory (ROM) 114, and keep-alive memory (KAM) 116. These functional classifications of memory may be implemented by one or more different physical devices such as PROMs, EPROMs, EEPROMs, flash memory, and the like, depending upon the particular application.

MPU 106 communicates with various actuators of engine 12 via output ports 118. Actuators may control ignition timing or spark SPK, timing and metering of fuel FIN, position of throttle valve TVA to control air flow, intake valve timing (IVT) to control intake air into combustion chamber and exhaust valve timing (EVT). In a control mode where throttled intake air control is required, the position of throttle valve 44 is variably adjusted to control intake air into combustion chamber 16 without relying on adjustment of intake valve close (IVC) time. In another control mode where unthrottled intake air control is required, IVC control is performed. In IVC control, intake valve close time is variably adjusted to control intake air into combustion chamber 16 without relying on throttling of air flow by throttle valve 44.

In a preferred embodiment, MPU 106 executes instructions stored in computer-readable media 110 to carry out a method for unthrottled intake air control to communicate with intake means 24 for controlling the speed of shift of IVC time from a current time to a desired time to provide different engine response performances required by different kinds of change in engine operating condition.

Figure 4A:
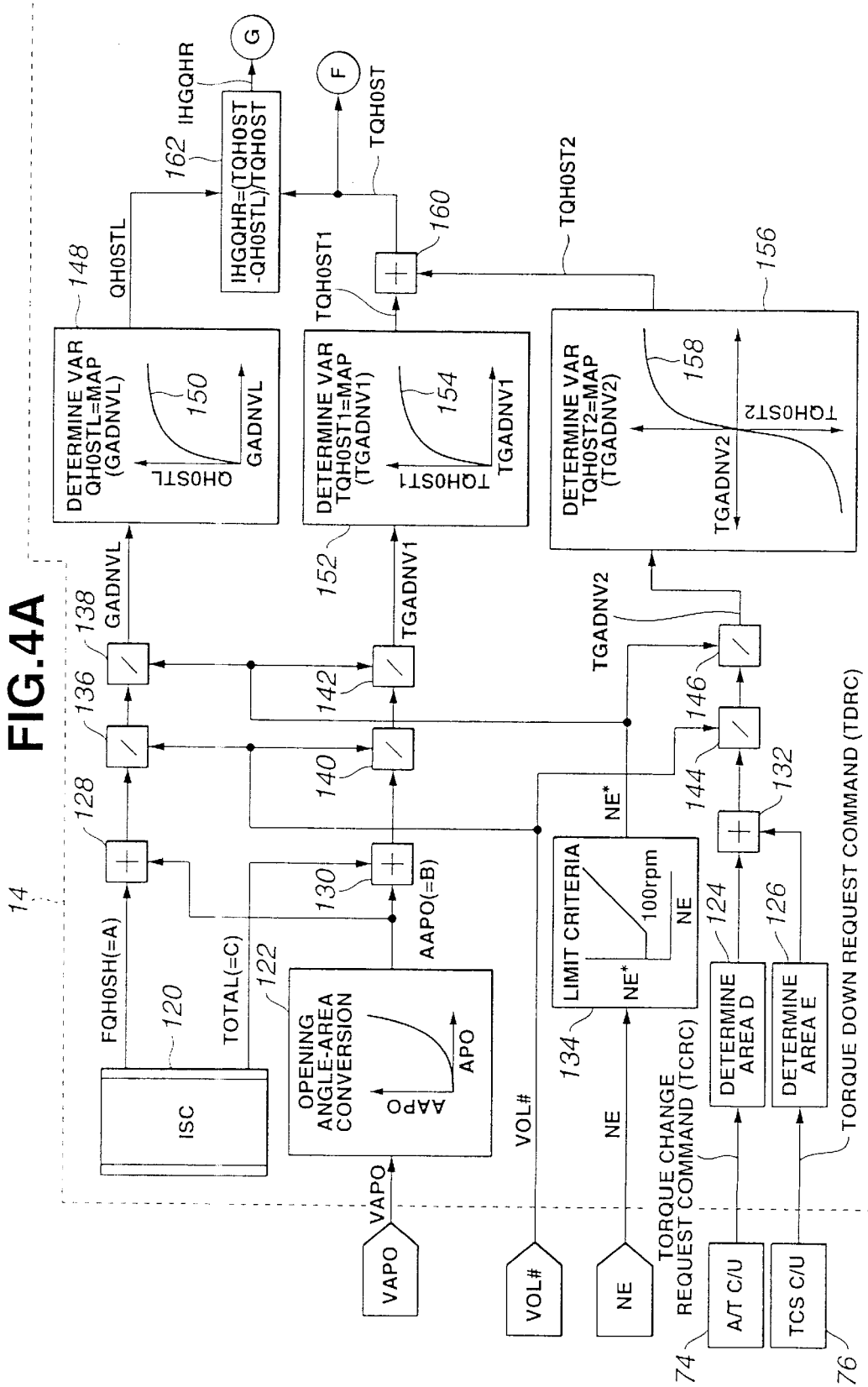
FIGS. 4A and 4B, when combined, illustrate a control diagram of controls according to the present invention.
Figure 4B:
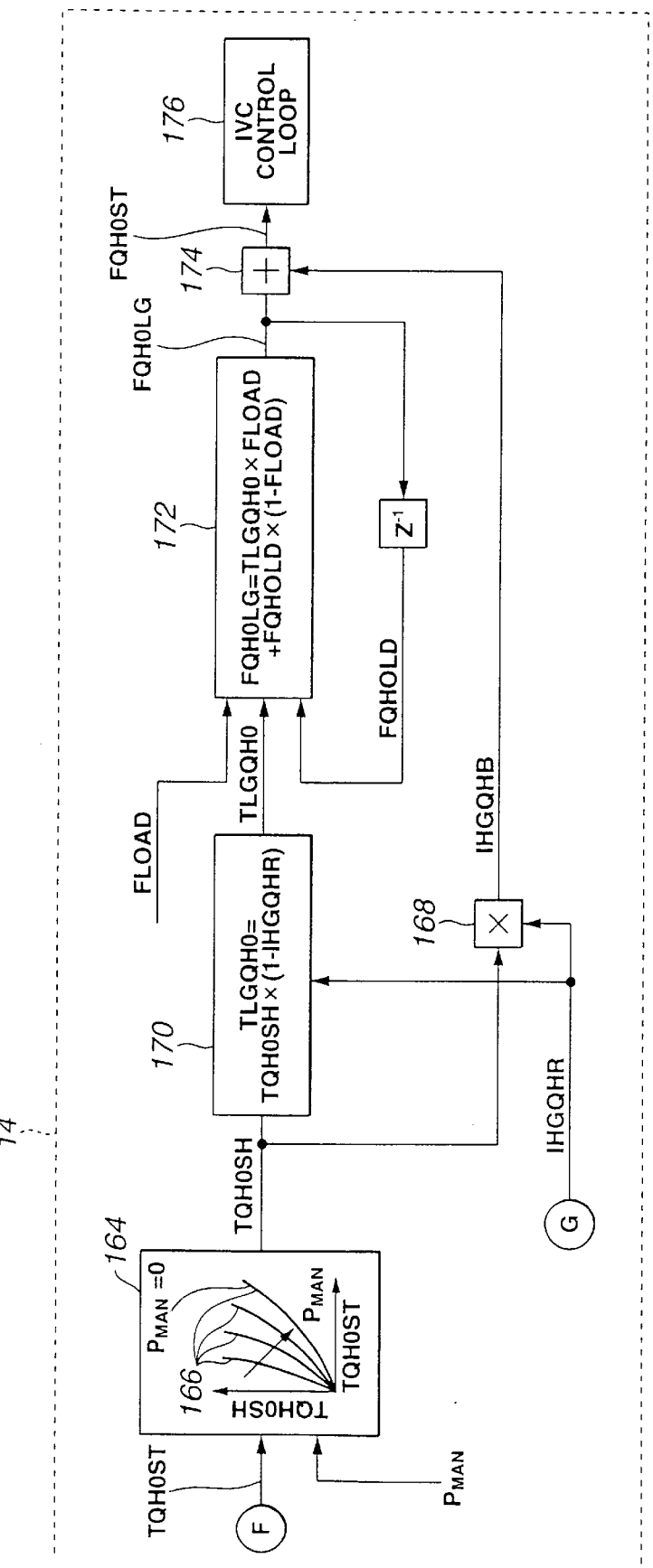

FIGS. 4A and 4B, when combined, provide a block diagram illustrating representative controllers for idle speed control, engine torque control based on operator toque request command, and engine torque control based on engine torque change request command or commands from other control units according to the present invention. As illustrated, in the preferred embodiment, C/U 14 is used to implement idle speed control (ISC), indicated by reference numeral 120. ISC 120 determines a requested or desired air flow rate based on a desired engine speed. The requested air flow rate includes a temperature dependent portion to accomplish the desired engine speed, which may be set to different levels in response to classification of the monitored coolant temperature. The temperature dependent portion is converted into a flow cross sectional area or opening area FQH0SH that may be represented by an area A (cm$^2$). For this conversion, an appropriate converter, not shown, is used. The total requested air flow rate, including the temperature dependent portion, is converted into a flow cross sectional area or opening area TOTAL that may be represented by an area C (cm$^2$) using an appropriate converter, not shown. As is well known, a change in the temperature dependent portion does not require aggressive engine response performance, but requires less aggressive engine response performance. In other words, a change in the area A requires less aggressive engine response performance. In the preferred implementation, a change in the remaining portion of the requested air flow rate is considered to require aggressive engine response performance. Thus, a change in an area C–A requires aggressive engine response performance.

In the preferred embodiment, C/U 14 implements engine torque control based on operator torque request command. VAPO signal from accelerator sensor 52 is used as an input. An APO to AAPO converter 122 is provided to convert an accelerator pedal opening (APO) to a flow cross sectional area or opening area AAPO that may be represented by an area B (cm$^2$). APO is a parameter indicative of operator torque request command, which operator has expressed through manipulation of accelerator pedal 50 (see FIG. 1). As illustrated in the block of APO to AAPO converter 122, the variation of AAPO against APO within a range of small values of APO is less than the variation within a range of large values of APO. Within a range of intermediate values of APO, the variation of AAPO against APO interconnects smoothly the two different variations of AAPO. AAPO to APO converter 122 may include a look-up table containing retrievable values of AAPO against values of APO reflecting the variation characteristic of AAPO as illustrated. This look-up table may be stored in computer readable media 110. In the preferred embodiment, a change in area B requires less aggressive engine response performance.

In the preferred embodiment, C/U 14 implements engine torque control based on engine torque change request commands TCRC and TDRC from A/T C/U 74 and TCS C/U 76. TCRC from A/T C/U 74 is used as an input to a TCRC to D converter 124. Converter 124 determines and outputs an area D corresponding to the magnitude and sign (positive or negative) of torque indicated by TCRC. Converter 124 may include a look-up table stored in computer readable media 110. TDRC from TCS C/U 76 is used as an input to a TDRC to E converter 126. Converter 126 determines and outputs an area E corresponding to the magnitude and sign (negative) of torque indicated by TDRC. Converter 126 may include a look-up table stored in computer readable media 110. As is well known, aggressive engine response performance is required in response to input of TCRC or TDRC. Thus, a change in area D or E requires aggressive engine response performance.

From the above description in connection with FIGS. 4A and 4B, it is now understood that, in the preferred embodiment, areas (C–A), D and E require aggressive engine response performance, while areas A and B require less aggressive engine performance.

At a summation point 128, area B is added to area A to give a first sum (B+A). At a summation point 130, area C is added to area B to give a second sum (C+B). At a summation point 132, areas D and E are added to each other to give a third sum (D+E).

In the preferred embodiment, the first, second and third sums (B+A), (C+B) and (D+E) are divided, each by engine displacement VOL# and then by modified engine speed NE*, to give values (cm$^2$/rpm/cc) GADNVL, TGADNV1 and TGADNV2, respectively.

Modified engine speed NE* is an output of a limit criteria block 134, which receives engine speed NE and outputs NE as NE* when NE is higher than a predetermined value of 100 rpm and outputs 100 rpm as NE* when NE is not higher than the predetermined value of 100 rpm, With regard to the first sum (A+B), at a divider point 136, the first sum (B+A) is divided by VOL# to give a result. This result is divided at a divider point 138 by NE* to give GADNVL. With regard to the second sum (C+B), at a divider point 140, the second sum (C+B) is divided by VOL# to give a result. This result is divided at a divider point 142 by NE* to give TGADNV1. With regard to the third sum (D+E), at a divider point 144, the third sum (D+E) is divided by VOL# to give a result. This result is divided at a divider point 146 by NE* to give TGADNV2.

In the preferred embodiment, the values GADNVL, TGADNV1 and TGADNV2 are converted into volumetric airflow ratios (VARs) QH0STL, TQH0ST1 and TQH0ST2, respectively. A GADNVL to QH0STL converter 148 determines QH0STL as a predetermined function, as illustrated by a curve 150, against GADNVL. Converter 148 may include a look-up table containing retrievable VAR values of QH0STL against values of GADNVL reflecting the variation characteristic of VAR values of QH0STL as illustrated by curve 150. This look-up table may be stored in computer readable media 110. A TGADNV1 to TQH0ST1 converter 152 determines TQH0ST1 as a predetermined function, as illustrated by a curve 154, against TGADNV1. Converter 152 may include a look-up table containing retrievable VAR values of TQH0ST1 against values of TGADNV1 reflecting the variation characteristic of VAR values of TQH0ST1 as illustrated by curve 154. This look-up table may be stored in computer readable media 110. A TGADNV2 to TQH0ST2 converter 156 determines TQH0ST2 as a predetermined function, as illustrated by a curve 158, against TGADNV2. Converter 156 may include a look-up table containing retrievable VAR values of TQH0ST2 against values of TGADNV2 reflecting the variation characteristic of VAR values of TQH0ST2 as illustrated by curve 158. This look-up table may be stored in computer readable media 110. It is to be noted that the curves 150, 154 and 158 illustrate the same variation characteristic of VAR values, which can determined theoretically.

At a summation point 160, TQH0ST1 and TQH0ST2 are added to each other to give a total VAR value TQH0ST for the total of areas (C+B+D+E). TQH0ST is fed to a junction point F and also to a ratio generator 162. GH0STL, which is a VAR value for the area (B+A), is fed to ratio generator 162. Ratio generator 162 calculates a ratio IHGQHR, which can be expressed as, $$IHGQHR = (TQH0ST - QH0STL)/TQH0ST \quad (1).$$

Ratio generator 162 provides IHGQHR to a junction point G.

Referring FIG. 4B, TQH0ST is fed to a total airflow rate indicative parameter generator 164. Also fed to generator 164 is a boost pressure $P_{MAN}$ within intake manifold 26. The boost pressure $P_{MAN}$ is kept at a desired one of different levels by controlling throttle valve 44 based on TQH0ST and NE. It is to be noted that this control of throttle valve 44 is to keep boost pressure $P_{MAN}$ constant. Generator 164 may include look-up tables against various levels of boost pressure $P_{MAN}$, each containing retrievable values of TQH0SH against values of TQH0ST reflecting the corresponding one of curves 166. These look-up tables may be stored in computer readable media 110. Generator determines and provides TQH0SH to a first multiplier 168 and also to a second multiplier 170.

Multiplier 168 calculates the product of IHGOHR and TQH0SH to give IHGQHB, which is indicative of an aggressive engine response performance request portion, i.e., a portion requesting aggressive engine response performance. Multiplier 170 calculates TLGQH0 that is expressed by the following equation:

$$TLGQH0 = TQH0SH \times (1 - IHGQHR) \quad (2).$$

TLGQH0 is indicative of a less aggressive engine response performance request portion, i.e., a portion requesting less aggressive engine response performance. Multiplier 170 provides TLGQH0 as a first input to a delay 172. Delay 172 determines and provides a processed value FQH0LG as an output. FQH0LG is held as an old or preceding output FQHOLD. FQHOLD is fed as a second input to delay 172. Weight value FLOAD is fed as a third input to delay 172. Various weight values are stored against values of NE and values of load. Delay 172 determines FGH0LG by calculating the following equation:

$$FQH0LG = TLGQH0 \times FLOAD + FQHOLD \times (1 - FLOAD) \quad (3).$$

The outputs of delay 172 and multiplier 168 are combined at a summation point 174 to give an output FQH0ST, which is expressed as:

$$FQH0ST = FQH0LG + IHGQHB \quad (4).$$

FQH0ST is used as an input to intake valve close time (IVC) control loop, generally designated by reference numeral 176. Briefly, IVC control loop 176 may use a look-up table containing values of intake valve close (IVC) time against values of FQH0ST reflecting the variation characteristic curve 178 shown in FIG. 7. This look-up table may be stored in computer readable media 110. After determining IVC time, IVC control loop 176 determines IVT and provides the determined IVT to intake means 24 for adjustment to the determined IVC time.

Figure 7:
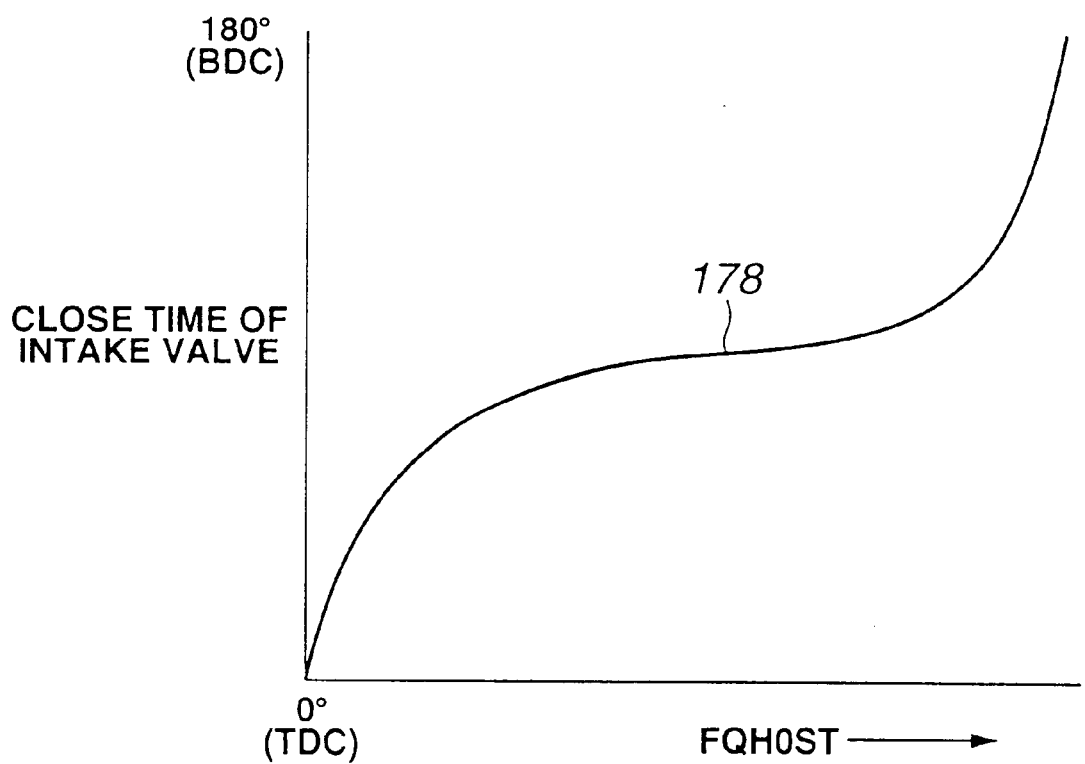
FIG. 7 is a graph illustrating the variation of close time of intake means, which may be called intake valve close (IVC) time, against a requested airflow (FQH0ST).

In this preferred embodiment, intake valve open (IVO) time is fixedly set near exhaust top dead center (TDC). As illustrated in FIG. 7, curve 178 illustrates the variation characteristic of cylinder air charge during downward stroke of piston from TDC down to BDC. If the requested intake airflow as indicated by FQH0ST increases, IVC time is delayed toward BDC.

Figure 8A:
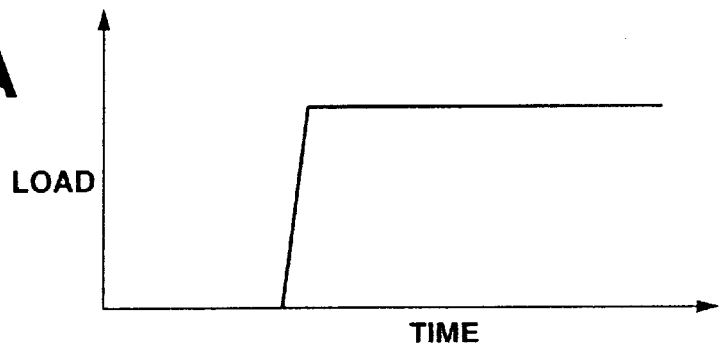
FIGS. 8A, 8B and 8C are graphs illustrating engine response performance with the benefit of the present invention as compared to engine response performance without the benefit of the present invention.
Figure 8B:
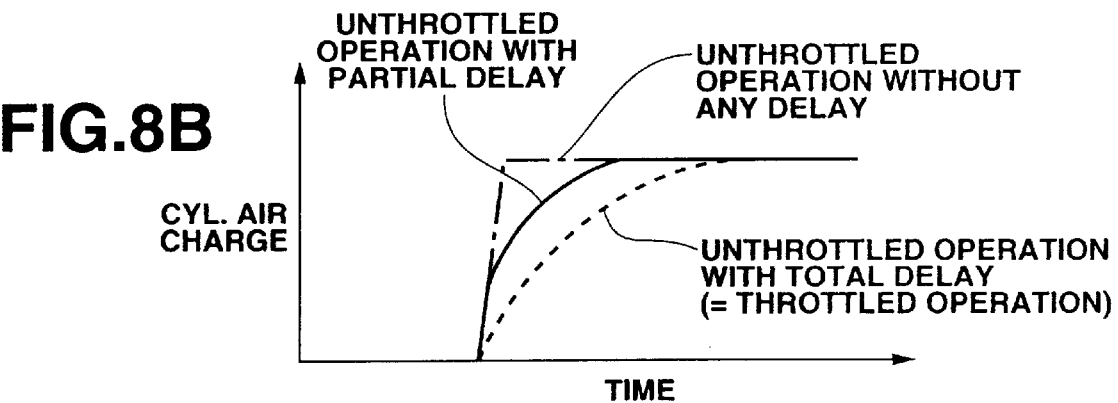
Figure 8C:
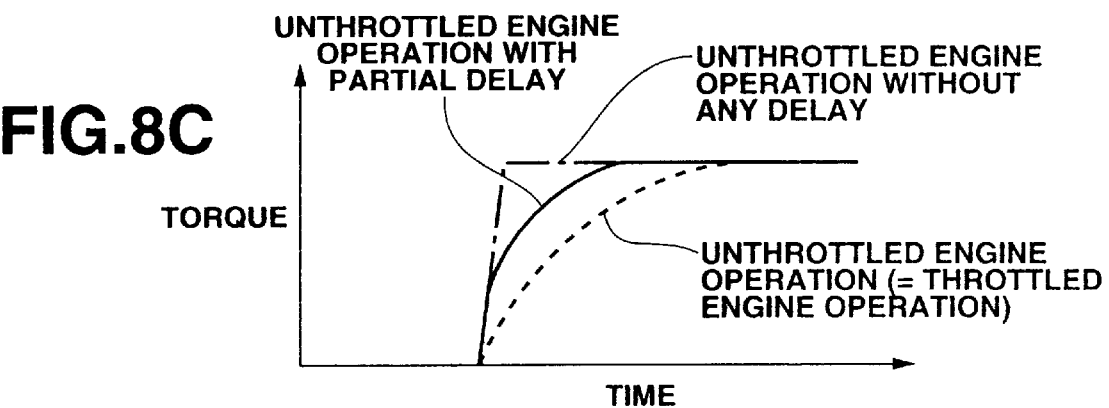

Referring to FIGS. 8A, 8B and 8C, the fully drawn line in FIG. 8B illustrates smooth transition of cylinder air charge with the benefit of the present invention after application of load as illustrated in FIG. 8A. The one-dot chain line in FIG. 8B illustrates aggressive response without the benefit of the present invention, and the dotted line in FIG. 8B illustrates sluggish response without the benefit of the present invention. The fully drawn in FIG. 8C illustrates requested engine response with the benefit of the present invention. The one-dot chain line in FIG. 8C illustrates aggressive engine response without the benefit of the present invention. The dotted line in FIG. 8C illustrates sluggish engine response without the benefit of the present invention.

Figure 5:
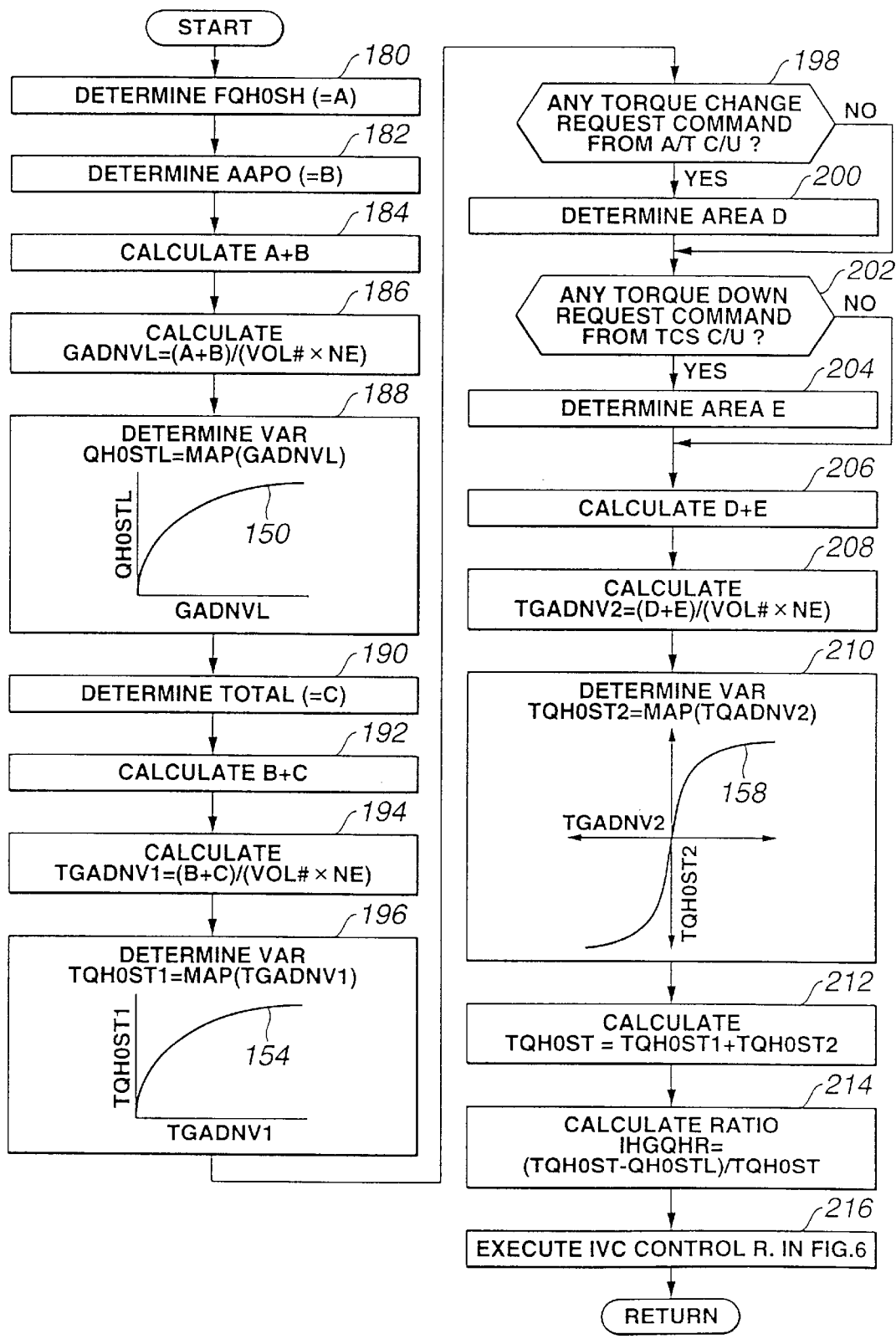
FIGS. 5 and 6 are flow charts illustrating control logic according to the present invention.
Figure 6:
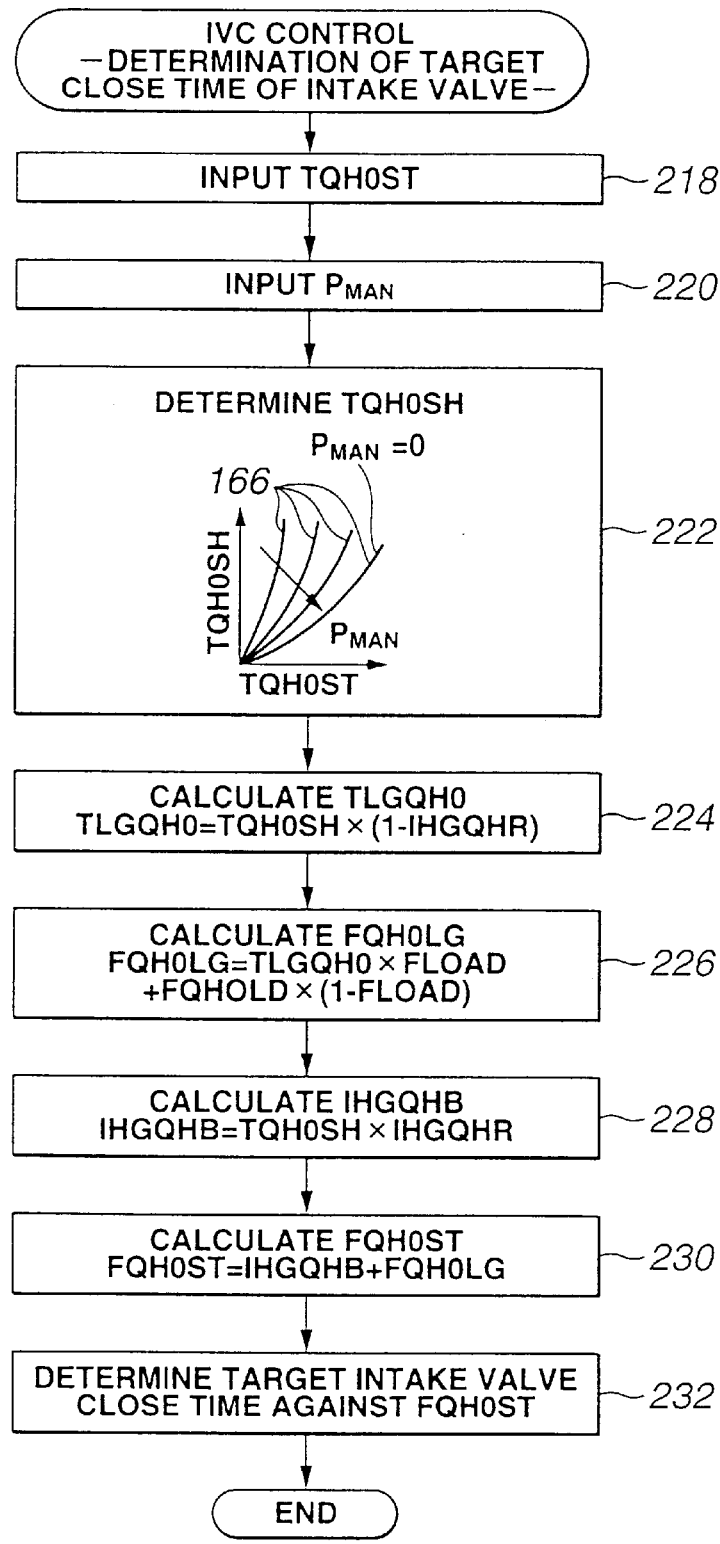

An example of how C/U 14 would implement the present invention can be understood with reference to FIGS. 5 and 6. The flow charts of FIGS. 5 and 6 illustrate control logic for providing unthrottled intake air control in a system or method according to the present invention. One of ordinary skill in the art will recognize that the control logic may be implemented in software, hardware, or a combination of software and hardware.

Likewise, various processing strategies may be utilized without departing from the sprit or scope of the present invention. The sequences of operations illustrated in not necessarily required to accomplish the advantages of the present invention, and is provided for ease of illustration only. Likewise, various steps may be performed in parallel or by dedicated electric or electronic circuits.

In FIG. 5, step 180 represents determination of area FQH0SH (=A). Step 182 represents determination of area AAPO (=B). Step 184 represents calculation of first sum A+B. Step 186 represents calculation of GADNVL that is expressed by (A+B)/(VOL#×NE). Step 188 represents determination of VAR QH0STL by performing look-up operation of mapped data as illustrated by curve 150.

Step 190 represents determination of area TOTAL (=C). Step 192 represents calculation of second sum B+C. Step 194 represents calculation of TGADNV1 that is expressed by (B+C)/(VOL#×NE). Step 196 represents determination of VAR TQH0ST1 by performing look-up operation of mapped data as illustrated by curve 154.

Step 198 represents interrogation whether there is any torque change request command (TCRC) from A/T C/U 74. If this is the case (YES), the routine proceeds to step 200. If this is not the case (NO), the routine proceeds to step 202. Step 200 represents determination of area D for TCRC. Step 202 represents another interrogation whether there is any torque down request command (TDRC) from TSC C/U 76. If this is the case (YES), the routine proceeds to step 204. If this is not the case (NO), the routine proceeds to step 206. Step 204 represents determination of area E for TDRC. Step 206 represents calculation of third sum D+E. Step 208 represents calculation of TGADNV2 that is expressed by (D+E)/(VOL#×NE). Step 210 represents determination VAR TQH0ST2 by performing look-up operation of mapped data as illustrated by curve 158.

Step 212 represents calculation of sum TQH0ST1+ TQH0ST2 to give TQH0ST. Step 214 represents calculation of ratio IHGQHR that is expressed by (TQH0ST−QH0STL)/ TQH0ST At step 216, IVC control routine in FIG. 6 is executed.

In FIG. 6, step 218 represents input of TQH0ST. Step 220 represents in put of boost pressure $P_{MAN}$. Step 222 represents determination of TQH0SH by performing look-up operation of mapped data as illustrated in curves 166.

Step 224 represents calculation of a less aggressive engine response request portion TLGQH0 that is expressed as TQH0SH×(1×IHGQHR). Step 226 represents delay processing to provide a delay-processed output FQH0LG that is expressed by TLGQH0×FLOAD+FQHOLD×(1−FLOAD). Step 228 represents calculation of an aggressive engine request portion IHGQHB that is expressed by TQH0SH× IHGQHR.

Step 230 represents calculation of FQH0ST that is expressed by IHGQHB+FGH0LG. Step 232 represents determination of target IVC time by look-up operation of mapped data as illustrated by curve 178 in FIG. 7.

Figure 9:
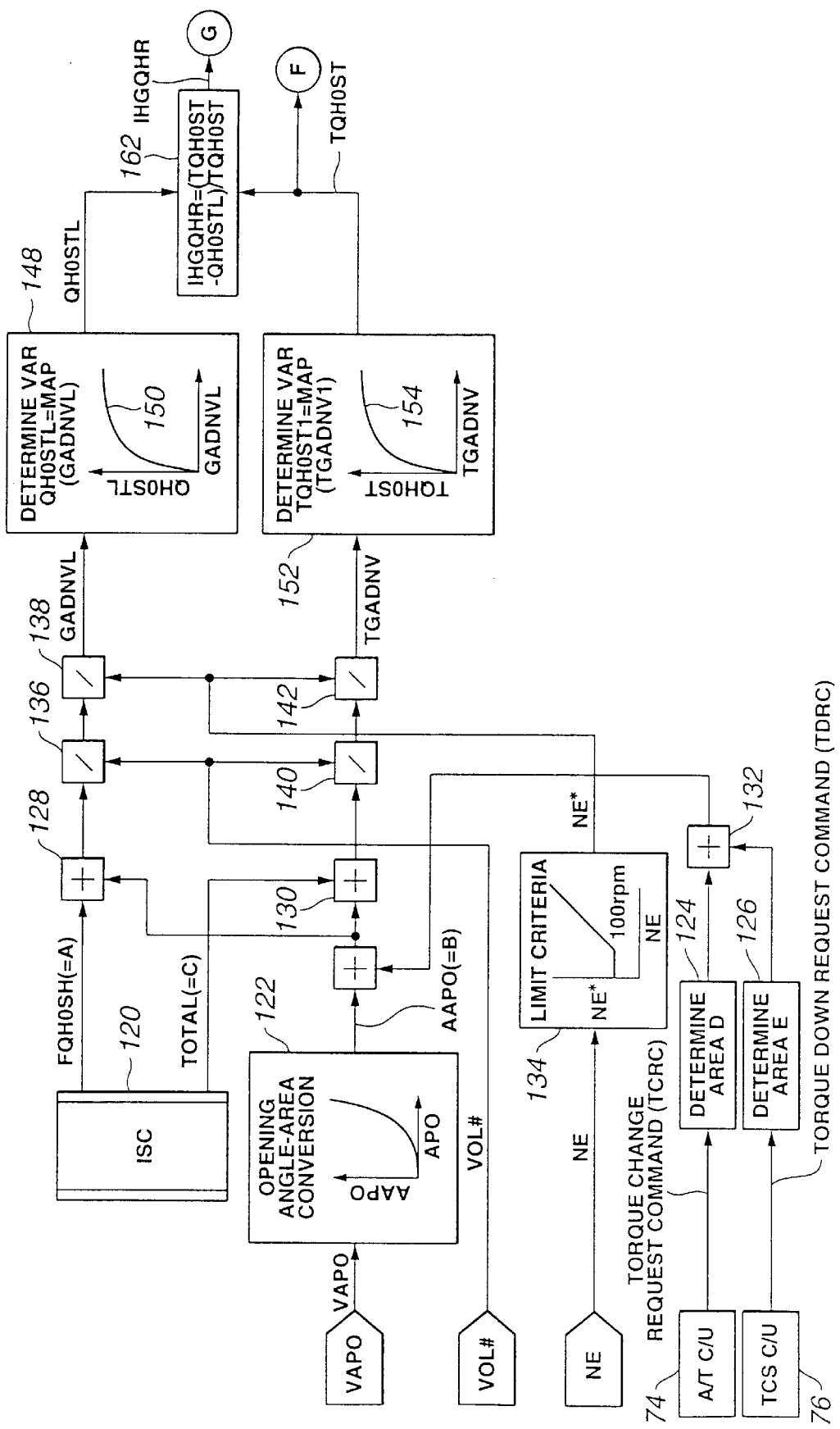
FIG. 9, when combined with FIG. 4B, illustrates modified controls according to the present invention.

FIG. 9 presents a block diagram illustrating a modification of FIG. 4A. In FIG. 4A, TQH0ST1 for (B+C) and TQH0ST2 for (D+E) are combined at summation point 160 to give TQH0ST. In the modification shown in FIG. 9, areas (D+E) are added to area (B+C) at summation point 130 to provide total sum (B+C+D+E). Converter 148 provides QH0STL for sum (A+B), while converter 152 provides TQH0ST for sum (B+C+D+E). The modification is simpler than that illustrated by block diagram of FIG. 4A because conversion at converter 156 is no longer needed.

Figure 10:
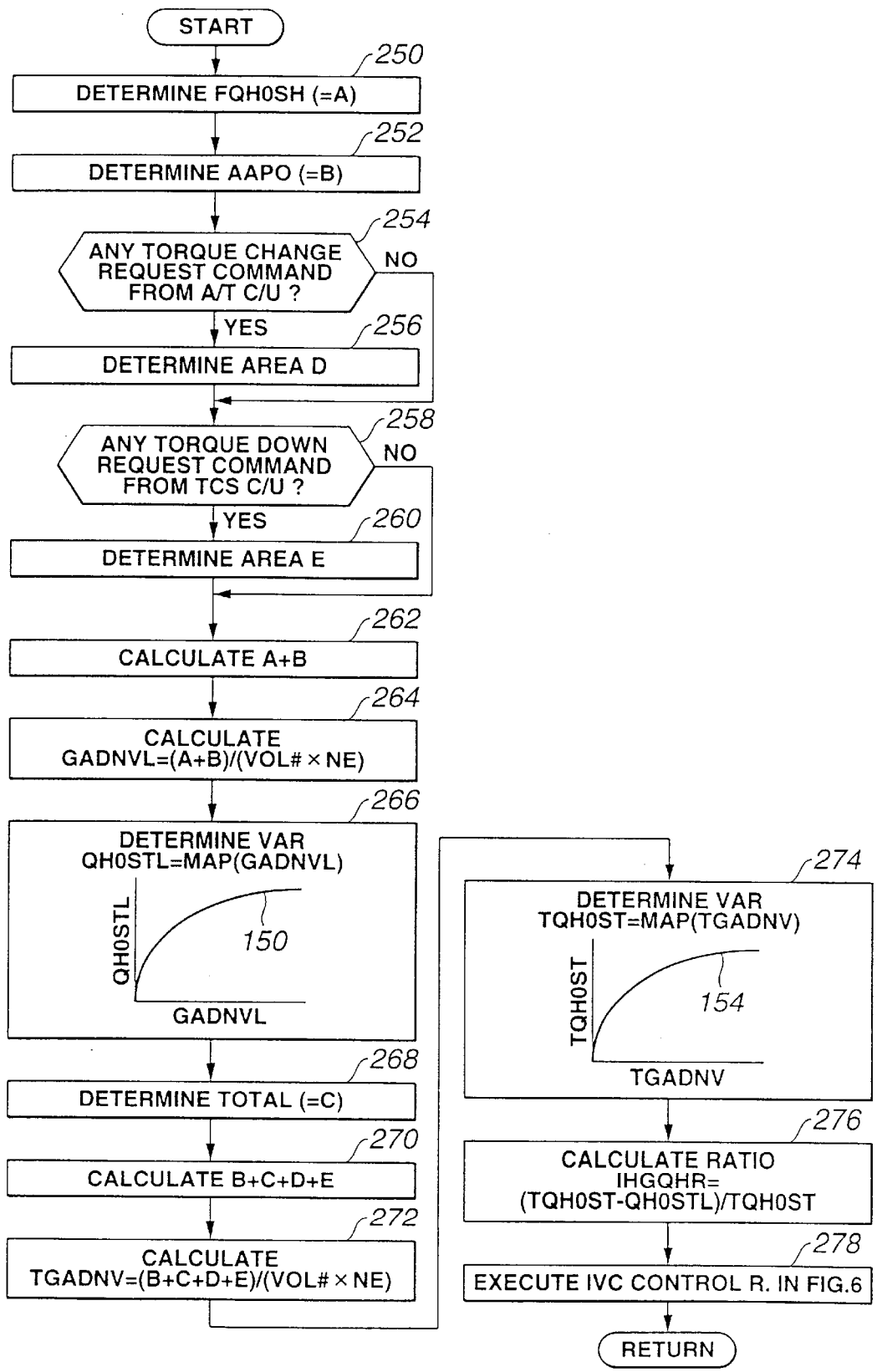
FIG. 10, when combined with FIG. 6, provides a flow chart illustrating modified control logic according to the present invention.

An example of how C/U 14 would implement the modification as illustrated in FIG. 9 can be understood with reference to FIGS. 10.

In FIG. 10, step 250 represents determination of area A. Step 252 represents determination of area B. Step 254 represents interrogation whether there is any TCRC from A/T C/U 74. If this is the case (YES), the routine proceeds to step 256. If this is not the case (NO), the routine proceeds to step 258. Step 256 represents determination of area D. Step 258 represents interrogation whether there is any TDRC from TCS C/U 76. If this is the case (YES), the routine proceeds to step 260. If this is not the case (NO), the routine proceeds to step 262. Step 260 represents determination of area A. Step 262 represents calculation of A+B. Step 264 represents calculation of GADNVL that is expressed by (A+B)/(VOL#×NE). Step 266 represents determination of VAR QH0STL by performing look-up operation of mapped data as illustrated by curve 150.

Step 268 represents determination of area TOTAL (=C). Step 270 represents calculation of sum B+C+D+E. Step 272 represents calculation of TGADNV that is expressed by (B+C+D+E)/(VOL#×NE). Step 274 represents determination of VAR TQH0ST by performing look-up operation of mapped data as illustrated by curve 154.

Step 276 represents calculation of ratio IHGQHR that is expressed by (TQH0ST×QH0STL)/TQH0ST. At step 278, IVC control routine in FIG. 6 is executed.

Figure 11A:
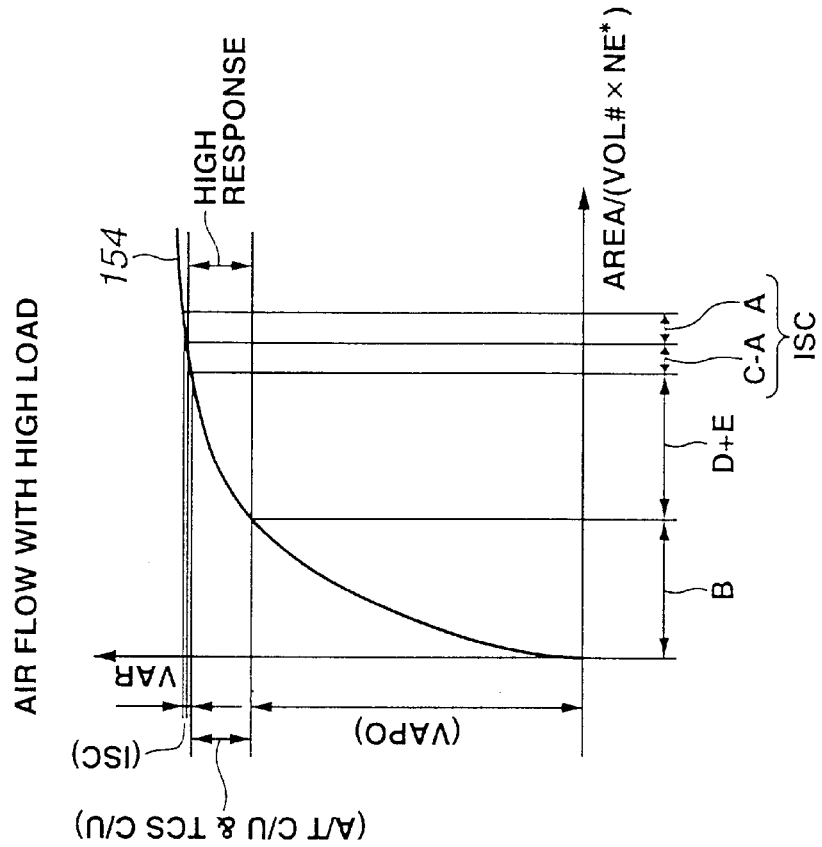
FIGS. 11A and 11B are graphs illustrating how volumetric airflow ratio values for the same opening area for idle speed control varies with variation in load.
Figure 11B:
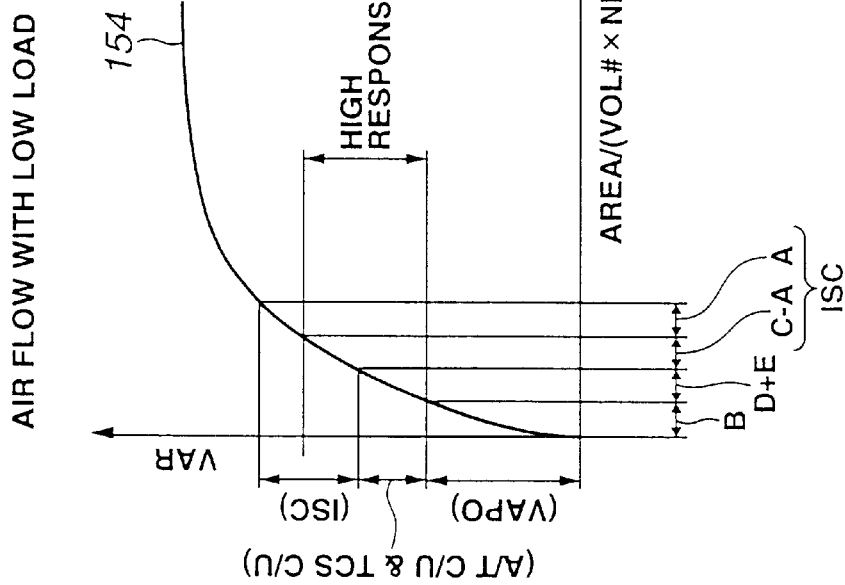

FIGS. 11A and 11B provide graphs illustrating how the same amount of area C for ISC is converted into VAR during operation with high load and during operation with low load. As illustrated in FIGS. 11A and 11B, VAR converted from areas C−A and A for ISC is considerably small during operation with high load as compared to that during operation with low load. As load increases, total airflow rate of intake air increases, so that contribution to airflow rate by the same area decreases.

Volumetric airflow ratio (VAR) for an area portion A for ISC is now represented by $QH0ST_A$. It is now explained how to determine $QH0ST_A$ with increased accuracy against variation of load.

First step represents determination of a volumetric ration $QH0ST_B$ for area B, which requests less aggressive engine response, determined for operator torque request command in a manner as explained in connection with FIG. 4A. Second step represents determination of a volumetric airflow ratio $QH0ST_{D+E}$ for areas D+E, which request aggressive engine response.

Third step represents addition of $QH0ST_{D+E}$ to $QH0ST_B$ to give a sum of volumetric airflow ratios ($QH0ST_{D+E}$+ $QH0ST_B$). Fourth step represents reverse conversion from QH0ST to GADNV using curve 154 to give opening area per unit volumetric airflow $GADNV_{D+E+B}$ for the sum ($QH0ST_{D+E}$+$QH0ST_B$).

Fifth step represents determination of opening area per unit volumetric airflow GADNVC−A for an area portion (C−A) of total area C for ISC.

Sixth step represents addition of $GADNV_{C-A}$ to $GADNV_{D+E+B}$ to give a sum ($GADNV_{C-A}$+$GADNV_{D+E+B}$). Seventh step represents conversion from GADNV to QH0ST using curve 154 to give a volumetric airflow ratio $QH0ST_{(C-A)+(D+E+B)}$.

Eighth step represents determination of a volumetric airflow ratio $QH0ST_A$ by subtracting the sum ($QH0ST_{D+E}$+ $QH0ST_B$) from $QH0ST_{(C-A)+(D+E+B)}$.

Ninth step represents addition of $QH0ST_A$ to $QH0ST_B$ to give total volumetric airflow ratio for less aggressive response request areas A and B.

Figure 12A:
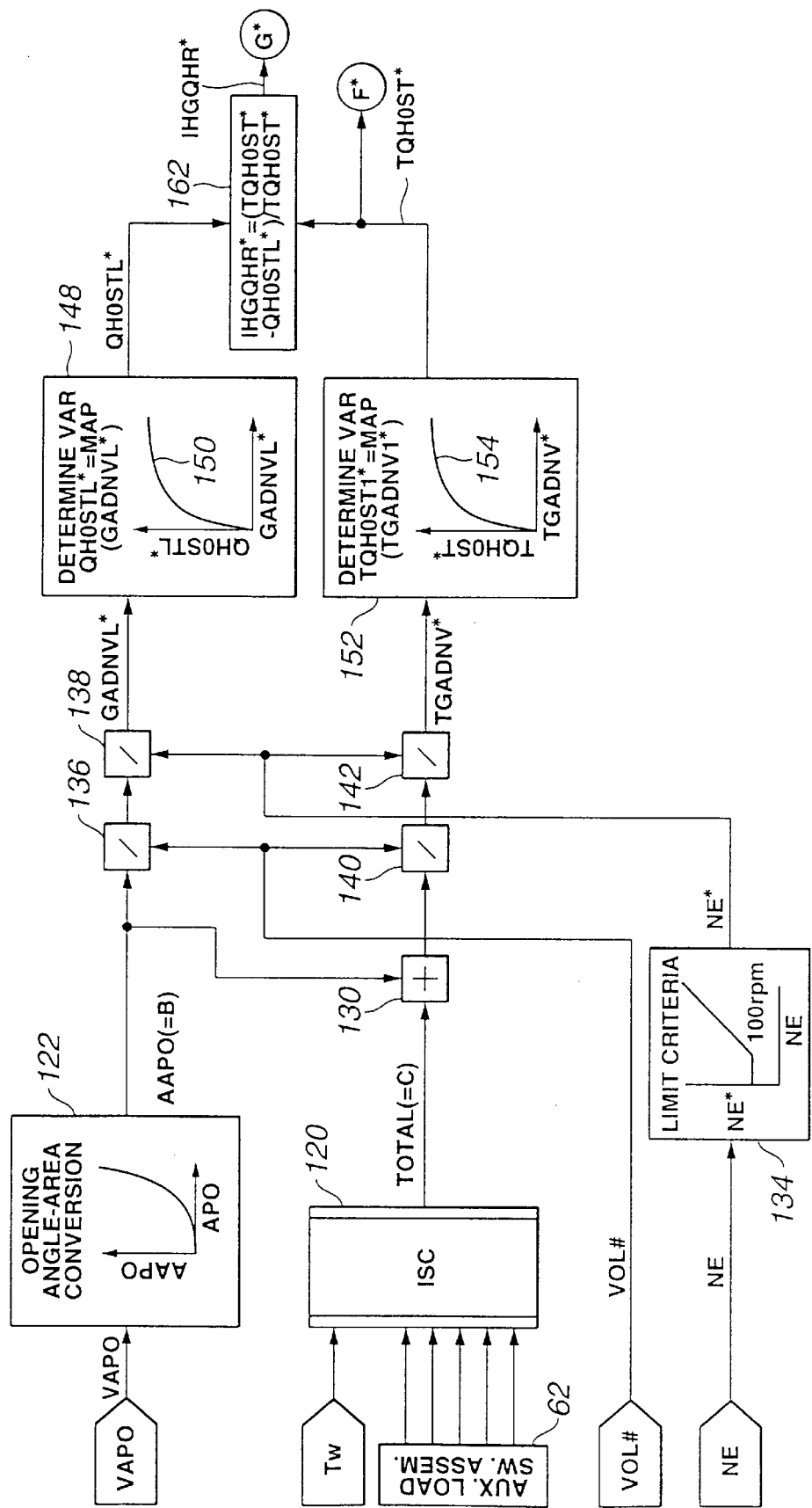
FIGS. 12A and 12B, when combined, provide a control diagram of controls according to the present invention.
Figure 12B:
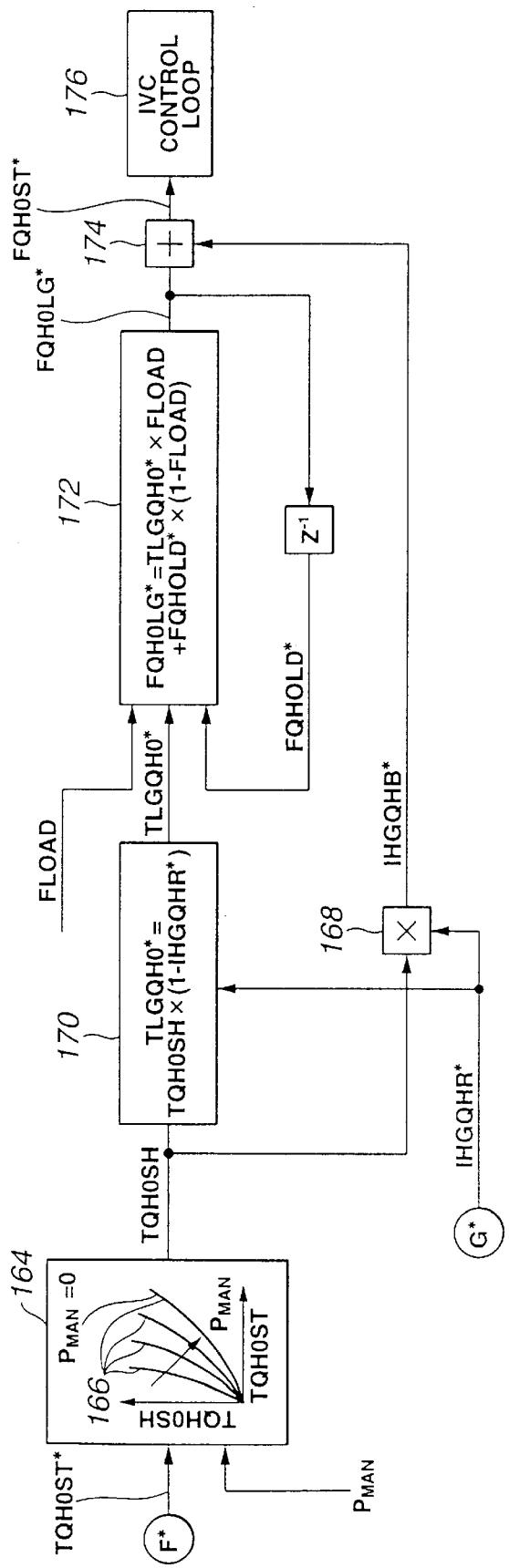

FIGS. 12A and 12B present a block diagram illustrating a further preferred embodiment of the present invention. In the further embodiment, it is considered that a change in total area TOTAL (=C) for ISC requests aggressive engine response performance, and operator torque request dependent area AAPO (=B) requests less aggressive engine response performance. Further, it is clarified in the block diagram that ISC 120 receives AMS to input various torque or engine speed change request commands from the associated auxiliary machines. This further preferred embodiment is similar to the modification illustrated by the block diagram shown in FIGS. 9 and 4B. The same reference numerals as used in FIGS. 9 and 4B are used to designate the same or similar parts or portions in FIGS. 12A and 12B.

In FIG. 12A, volumetric airflow ratio QH0STL* is determined by retrieving mapped data as illustrated by curve 150 against GADNVL* for area B at converter 148. Total volumetric airflow ratio TQH0ST* is determined by retrieving mapped data as illustrated by curve 154 against TGADNV* for area (B+C) at converter 152. At ratio generator 162, ratio IHGQHR* is calculated, As illustrated in FIG. 12B, using this ratio IHGQHR*, TLGQH0* and IHGQHB* are determined in the same manner as in FIG. 4B. TLGQH0* is indicative of requested airflow rate whose change requests less aggressive engine response. IHGQHB* is indicative of requested airflow rate whose change requests aggressive engine response. At delay 172, the same processing is carried out to provide delay-processed output FQH0LG* to summation 174. At summation 174, FQH0LG* is added to IHGQHB* to give FQH0ST*.

Figure 13:
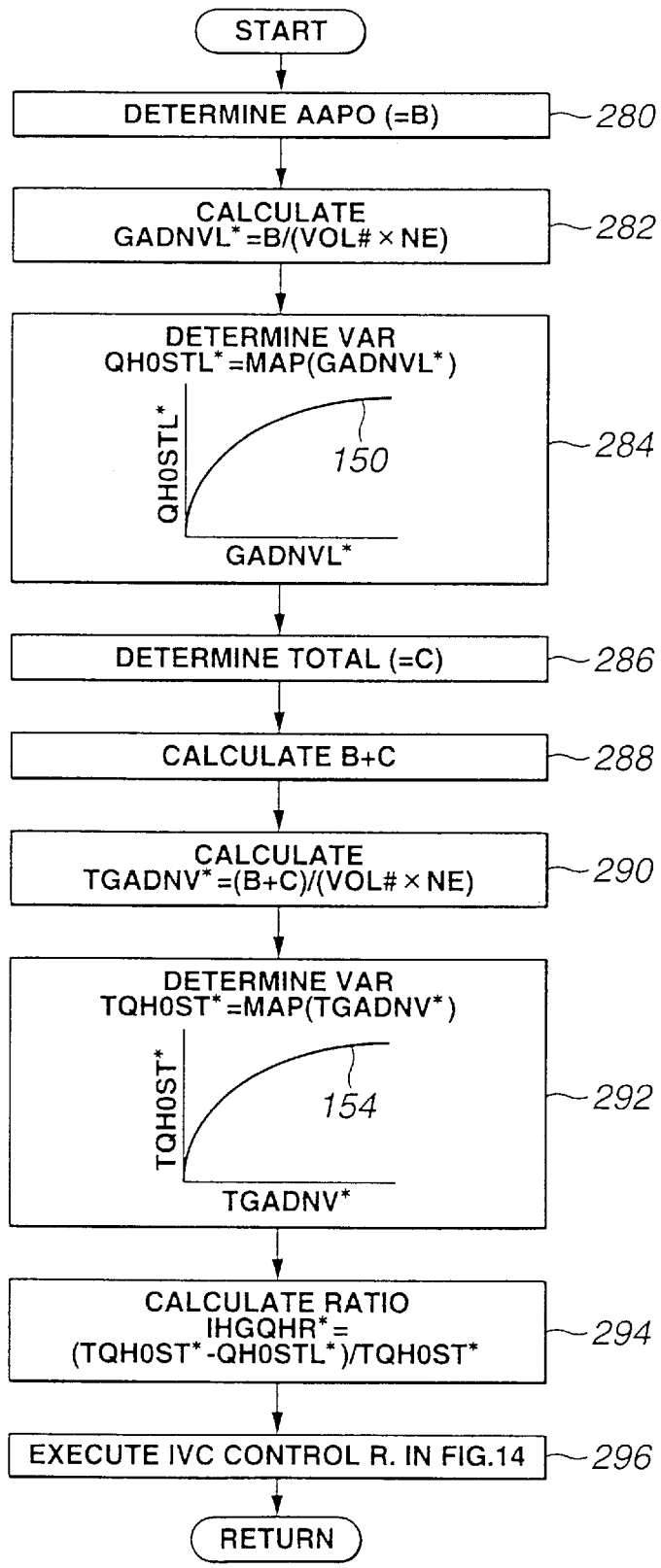
FIGS. 13 and 14, when combined, provide a flow chart illustrating control logic according to the present invention.
Figure 14:
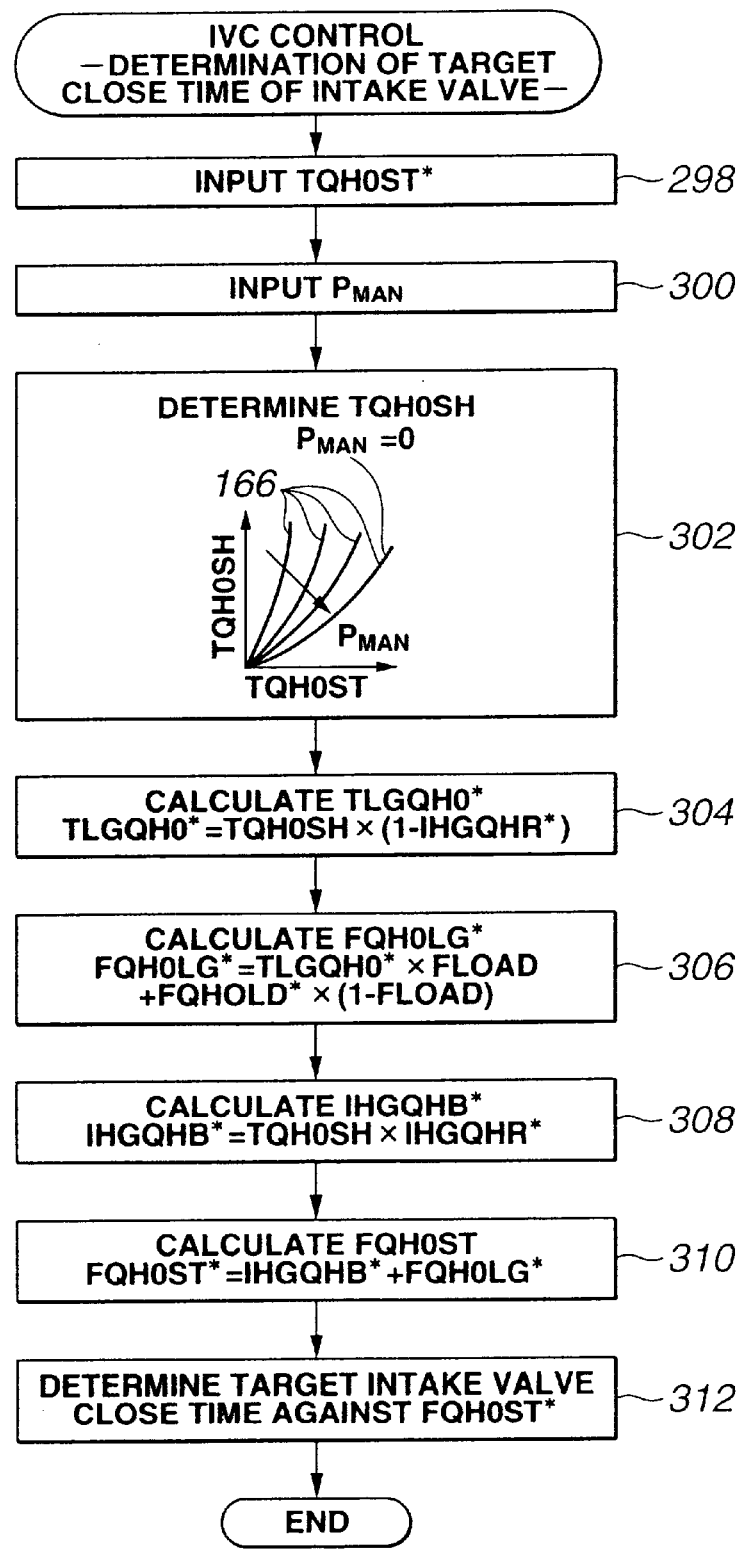

An example of how C/U 14 would implement the further embodiment can be understood with reference to FIGS. 13 and 14. The flow charts of FIGS. 13 and 14 illustrate control logic for providing unthrottled intake air control in a system or method according to the present invention.

In FIG. 13, step 280 represents determination of area AAPO (=B). Step 184 represents calculation of first sum A+B. Step 282 represents calculation of GADNVL* that is expressed by (A+B)/(VOL#×NE). Step 284 represents determination of VAR QH0STL* by performing look-up operation of mapped data as illustrated by curve 150.

Step 286 represents determination of area TOTAL (=C). Step 288 represents calculation of sum B+C. Step 290 represents calculation of TGADNV* that is expressed by (B+C)/(VOL#×NE). Step 292 represents determination of VAR TQH0ST* by performing look-up operation of mapped data as illustrated by curve 154.

Step 294 represents calculation of ratio IHGQHR* that is expressed by (TQH0ST*−QH0STL*)/TQH0ST*. At step 296, IVC control routine in FIG. 14 is executed.

In FIG. 14, step 298 represents input of TQH0ST*, Step 300 represents input of boost pressure $P_{MAN}$. Step 302 represents determination of TQH0SH by performing look-up operation of mapped data as illustrated in curves 166.

Step 304 represents calculation of a less aggressive engine response request portion TLGQH0* that is expressed as TQH0SH×(1−IHGQHR*). Step 306 represents delay processing to provide a delay-processed output FQH0LG* that is expressed by TLGQH0*×FLOAD+FQHOLD*×(1−FLOAD). Step 308 represents calculation of an aggressive engine request portion IHGQHB* that is expressed by TQH0SH×IHGQHR*.

Step 310 represents calculation of FQH0ST* that is expressed by IHGQHB*+FGH0LG*. Step 312 represents determination of target IVC time by look-up operation of mapped data as illustrated by curve 178 in FIG. 7.

Figure 15:
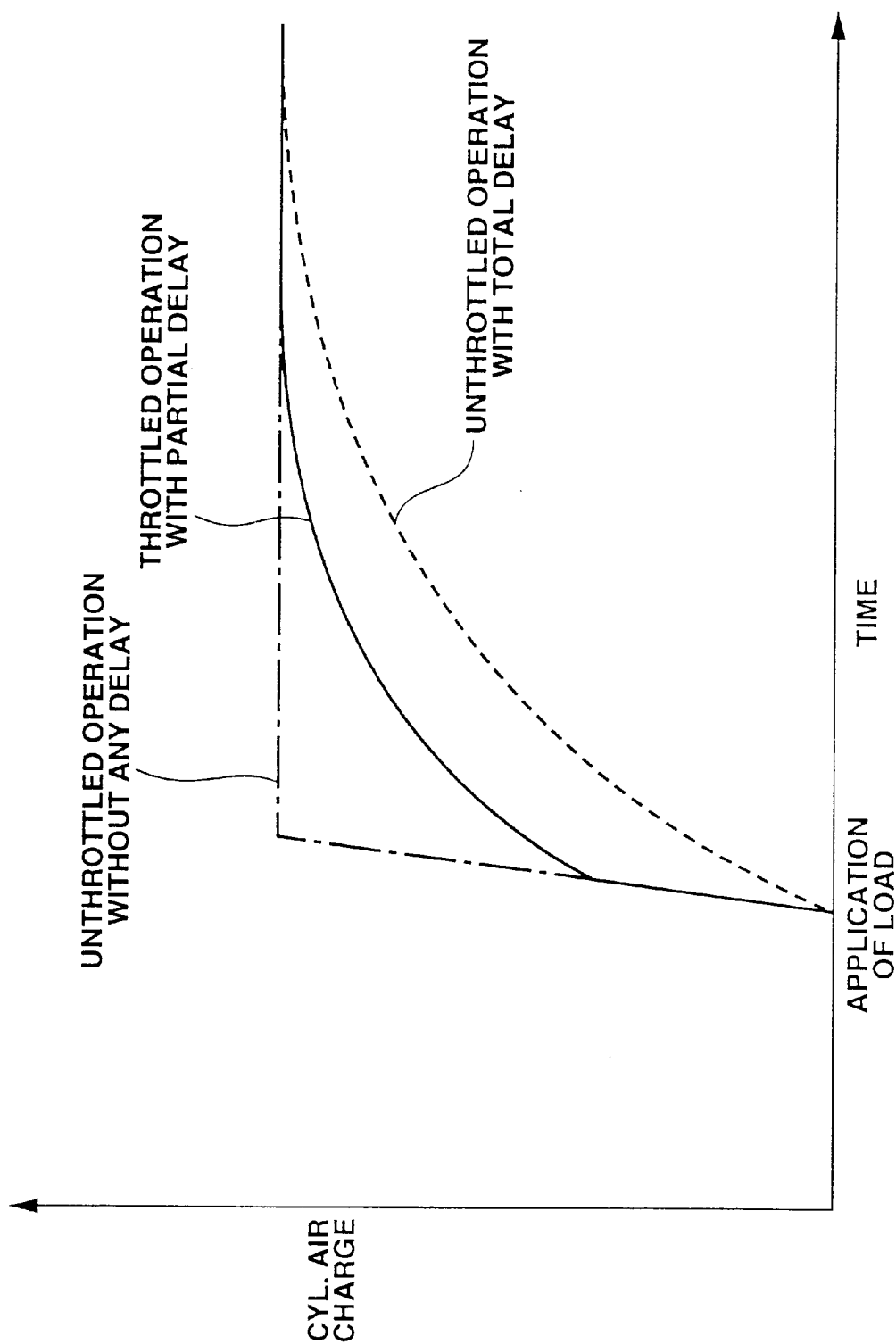
FIG. 15 is a graphical representation of engine response performance with the benefit of the present invention in comparison with engine response performance without the benefit of the present invention.

Referring to FIG. 15, the fully drawn line illustrates smooth transition of cylinder air charge with the benefit of the present invention after application of load as illustrated in FIG. 8A. The one-dot chain line illustrates aggressive response without the benefit of the present invention, and the dotted line illustrates sluggish response without the benefit of the present invention.

In the preferred embodiments, there was no delay to a change in IHGQHB (see FIG. 4B) or IHGQHB* (see FIG. 12B). If desired, an appropriate delay may be provided with respect to IHGQHB (see FIG. 4B) or IHGQHB* (see FIG. 12B) to accomplish requested response performance.

While the present invention has been particularly described, in conjunction with preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Applications Nos. 11-343910, filed Dec. 2, 1999, 11-345375, filed Dec. 3, 1999, 11-345374, filed Dec. 3, 1999, and 11-356401 filed Dec. 15, 1999, the disclosure of each of which is hereby incorporated by reference in its entirety.

What is claimed is:

1. A method for unthrottled control of intake air for an internal combustion engine, the engine having at least one combustion chamber provided with intake means, wherein the opening and closing times of the intake means are adjustable entirely independently from the crankshaft position to control intake air supplied to the combustion chamber, the method comprising:

determining a first portion of requested intake airflow, which first portion requests a first engine response performance;

determining a second portion of said requested intake airflow, which second portion requests a second engine response performance;

processing said first and second portions of said requested intake airflow to make contributions to said first and second engine response performances, respectively, and to provide processed requested airflow;

determining an intake means activation command in response to said processed requested airflow; and providing said intake means activation command to the intake means to provide an engine response performance combining said first engine response performance with said second engine response performance.

2. The method as claimed in claim 1, wherein the step of processing comprises:

providing a delay in transmission of a change in at least one of said first and second portions of said requested intake airflow to said processed requested intake airflow.

3. The method as claimed in claim 1, wherein said first engine response performance is less aggressive than said second engine response performance, and wherein the step of processing comprises:

providing a delay in transmission of a change in said first portion of said requested intake airflow.

4. The method as claimed in claim 3, wherein said delay is provided by generating an input signal value (TLGCH0) indicative of said first portion of said requested intake airflow, a weight value (FLOAD) and a current output signal value (FQH0LG), which current output signal value (FQH0LG) is given by calculating the following equation:

$$FQH0LG = TLGQH0 \times FLOAD + FQHOLD \times (1 - FLOAD)$$

where: FQHOLD is the preceding output signal value.

5. The method as claimed in claim 3, wherein said portion of said requested intake airflow is based on an operator torque request command.

6. The method as claimed in claim 3, wherein said first portion of said requested intake airflow is a temperature dependent portion for idle speed control.

7. The method as claimed in claim 3, wherein said second portion of said requested intake airflow is based on a torque change request command from an automatic transmission control unit.

8. The method as claimed in claim 3, wherein said second portion of said requested intake airflow is based on a torque change request command from a traction control system control unit.

9. The method as claimed in claim 6, further comprising:

determining opening area for idle speed control;

determining different values of volumetric airflow ratio for the same opening area determined for idle speed control against different levels of engine load, respectively, such that a volumetric airflow ratio value for a high level of engine load is greater than a volumetric airflow ratio value for a low level of engine load; and determining said requested intake airflow using said determined different values of volumetric airflow ratio.

10. The method as claimed in claim 3, wherein the step of determining said first portion of said requested intake airflow comprises:

determining a first volumetric airflow ratio for opening area B determined for operator torque request command;

determining a second volumetric airflow ratio for opening areas determined for commands which request aggressive engine response;

adding said first volumetric airflow ratio to said second volumetric airflow ratio to give a first sum of volumetric airflow ratios;

conducting reverse conversion to give first opening area per unit volumetric airflow for said first sum of volumetric airflow ratios;

determining second opening area per unit volumetric airflow for a predetermined portion of total area for idle speed control;

adding said second opening area per unit volumetric airflow to said first opening area per volumetric airflow to give a sum of opening areas each per unit volumetric airflow;

conducting conversion to give a third volumetric airflow ratio against said sum of opening areas each per unit volumetric airflow;

subtracting said first sum of volumetric airflow ratios from said third volumetric airflow ratio to give a fourth volumetric airflow ratio;

adding said fourth volumetric airflow ratio to said first volumetric airflow ratio to give a fifth volumetric airflow ratio; and using said fifth volumetric airflow ratio to determine said first portion of said requested intake air.

11. The method as claimed in claim 3, wherein the step of determining said first portion of said requested intake airflow comprises:

determining a first volumetric airflow ratio for operator torque request command;

determining a second volumetric airflow ratio for a portion of desired airflow for idle speed control;

adding said first volumetric airflow ratio to said second volumetric airflow ratio to give a total volumetric airflow ratio; and using said total volumetric airflow ratio to determine said first portion of said requested intake air.

12. The method as claimed in claim 1, further comprising:

determining first opening area (A) against a temperature dependent portion for idle speed control;

determining second opening area (B) against operator torque request command;

determining third area (C) against total of portions for executing the idle speed control;

determining a first volumetric airflow ratio (QH0STL) against a first sum of said first and second opening areas (A+B);

determining a second volumetric airflow ratio (TQH0ST1) against a second sum of said second and third opening areas (B+C);

determining a third volumetric airflow ratio (TQH0ST2) in response to a toque change request command to the engine;

determining a total volumetric airflow ratio (TQH0ST) based on said second and third volumetric airflow ratios;

determining a ratio (IHGQHR) based on said first volumetric airflow ratio (QH0STL) and said total volumetric airflow ratio;

determining said first portion of said requested intake airflow (TLGQH0) based on said total volumetric airflow ratio (TQH0ST) and the complement (1−IHGQHR) of said ratio (IHGQHR); and determining said second portion of said requested intake airflow (IHGQHR) based on said total volumetric airflow ratio (TQH0ST) and said ratio (IHGQHR).

13. The method as claimed in claim 5, wherein said second portion of said requested intake airflow is based on one of a plurality of commands from a plurality of accessories associated with the engine.

14. The method as claimed in claim 13, wherein said delay is provided by generating an input signal value (TLGCH0) indicative of said first portion of requested intake airflow, a weight value (FLOAD) and a current output signal value (FQH0LG), which current output signal value (FQH0LG) is given by calculating the following equation:

$$FQH0LG = TLGQH0 \times FLOAD + FQHOLD \times (1-FLOAD)$$

where: FQHOLD is the preceding output signal value.

15. A computer readable storage medium having stored therein data representing instructions executable by a computer to implement unthrottled control of intake air of an internal combustion engine, the engine having at least one combustion chamber provided with intake means, wherein the opening and closing times of the intake means are adjustable entirely independently from the crankshaft position to control the amount of intake air supplied to the combustion chamber, the computer readable storage medium comprising:

instructions for determining a first portion of requested intake airflow, which first portion requests a first engine response performance;

instructions for determining a second portion of said requested intake airflow, which second portion requests a second engine response performance;

instructions for processing said first and second portions of said requested intake airflow, to make contributions to said first and second engine response performances, respectively, and to provide processed requested airflow;

instructions for determining an intake means activation command in response to said processed requested airflow; and instructions for providing said intake means activation command to the intake means to provide an engine response performance combining said first engine response performance with said second engine response performance.

16. The computer readable storage medium as claimed in claim 15, wherein said first desired response performance is less aggressive than said second desired response performance, and wherein the instructions for processing comprise:

instructions for providing a delay in transmission of a change in said first portion of said requested intake airflow to said processed requested intake airflow.

17. The computer readable storage medium as claimed in claim 16, wherein the instructions for providing the delay comprise:

instructions for calculating the following equation to provide said delay:

$$FQH0LG = TLGQH0 \times FLOAD + FQHOLD \times (1-FLOAD)$$

where:
TLGCH0 is an input signal value indicative of said first amount of intake air;
FLOAD is a weight value;
FQH0LG is a current output signal value; and
FQHOLD is the preceding output signal value.

18. The method as claimed in claim 4, wherein said weight value is determined as a function of engine load and engine speed.

19. A system for unthrottled intake air control for an internal combustion engine, the engine having at least one combustion chamber, comprising:

intake means provided for the combustion chamber, wherein the opening and closing times of said intake means are adjustable entirely independently from the crankshaft position to control intake air supplied to the combustion chamber, said intake means includes an intake valve and a valve controller in the form of a electromagnetic driver;

sensors detecting varying engine operating conditions; and a control unit receiving signals from said sensors and implementing instructions for determining a first portion of requested intake airflow, which first portion requests a first engine response performance;

instructions for determining a second portion of said requested intake airflow, which second portion requests a second engine response performance;

instructions for processing said first and second portions of said requested intake airflow to make contributions to said first and second engine response performances, respectively, and to provide processed requested airflow;

instructions for determining an intake means activation command in response to said processed requested airflow; and instructions for providing said intake means activation command to said intake means to provide an engine response performance combining said first engine response performance with said second engine response performance.

* * * * *